July 9, 1929.  C. A. ROWLEY  1,720,527
DRAWING SHEET GLASS
Filed March 24, 1924
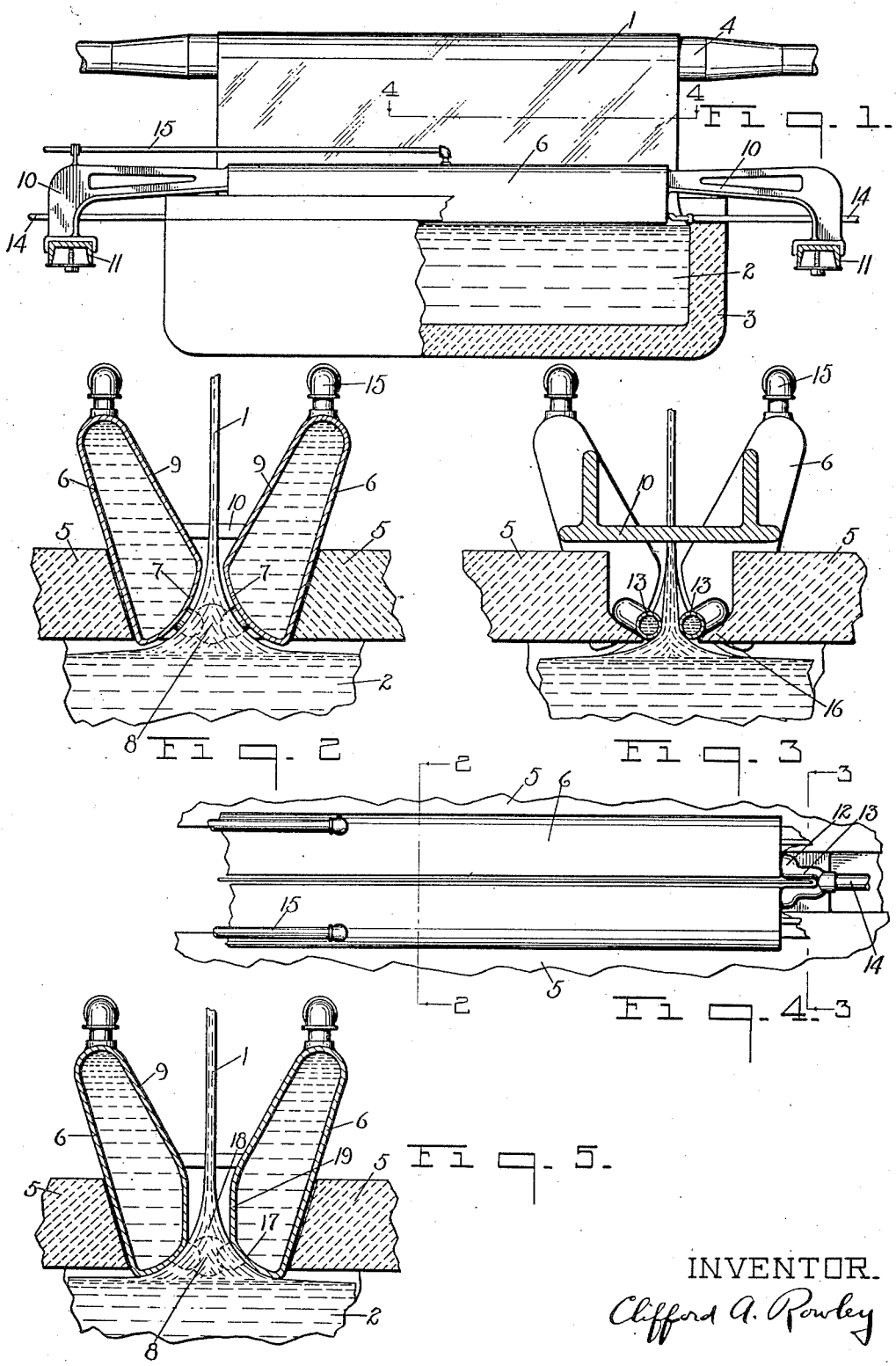
INVENTOR.
Clifford A. Rowley Patented July 9, 1929.

1,720,527

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed March 24, 1924. Serial No. 701,312.

This invention relates to the art of drawing sheet glass, and more particularly to an improved process and apparatus for drawing a sheet upwardly from the surface of a pool of molten glass.

According to this invention a rather highly heated mass of molten glass is maintained in a comparatively deep receptacle, the upper surface of the pool being entirely covered over except for a comparatively narrow surface strip from which the glass sheet is drawn upwardly. The passage through which the sheet is drawn upwardly is surrounded by a metallic cooling member of loop form which is positioned closely adjacent to the base of the sheet and the "meniscus" or upwardly sloping mass of glass pulled up by the glass sheet. The side portions of this cooler loop are of comparatively large cross-section so as to be able to withdraw a considerable amount of heat from the forming sheet, whereby a sheet source of high temperature can be quickly reduced to a sufficiently plastic condition to be drawn rapidly into sheet form. The end portions of the cooler loop are of smaller capacity, but the sides thereof are arranged more closely adjacent one another to provide a much narrower passage therebetween, through which the edge portions of the sheet are drawn upwardly in direct contact therewith. Preferably the central portion of the sheet does not directly contact with the coolers positioned at the sides thereof, although these coolers may be so proportioned as to have direct contact with the sheet source.

This construction has several advantages among which are:—The mass of glass from which the sheet is drawn may be maintained at a relatively high temperature thus avoiding the formation of dog-metal or devitrified glass; the coolers of large capacity arranged closely adjacent the sheet allow the sheet to be drawn at a rapid rate, thus giving a high productive capacity to the machine; there are no moving parts, thus reducing the operating expense; and the molten source is almost entirely protected from the outer air, reducing to a minimum the liability of contaminating the sheet by dirt or other débris.

The invention will be more clearly understood from the following detailed description of certain approved forms of the apparatus.

In the accompanying drawings:

Fig. 1 is an elevation of the apparatus, partly broken away, looking toward the face of the drawn sheet.

Fig. 2 is a longitudinal vertical section, on an enlarged scale, through the sheet forming portion of the apparatus, taken substantially on the line 2—2 of Fig. 4.

Fig. 3 is a similar section taken substantially on the line 3—3 of Fig. 4.

Fig. 4 is a plan view of a portion of the mechanism taken substantially on the line 4—4 of Fig. 1.

Fig. 5 is a view similar to Fig. 2, showing a modified form of the apparatus.

Referring first to Figs. 1 to 4, the glass sheet 1 is drawn upwardly from the mass of glass 2 in receptacle 3. As here shown the sheet 1 is bent into the horizontal about a bending roller 4, as in the Colburn system, but this feature is not essential and the sheet may be drawn continuously upward if so desired. The receptacle 3, which is in open communication with some source of molten glass, such as a continuous tank furnace, is comparatively deep so as to contain a rather large volume of molten glass 2 which is maintained at a relatively high temperature, too hot to be drawn directly into sheet form until its temperature has been considerably lowered. Any suitable form of heating means may be used beneath the receptacle 3, it being necessary, to maintain this glass at the proper temperature.

The upper surface of the glass 2 is entirely covered over by tiles 5 except for a rather narrow rectangular strip across the width of the pot which is substantially filled by the cooler loop now to be described.

The main side portions of this loop are formed by a pair of hollow metallic members 6 of substantially the form shown in Figs. 2 and 3. These coolers are widest at their lower ends 7 which curve substantially as shown so as to conform to the natural curvature of the so-called "meniscus" 8 which is drawn up from the surface of pool 2 by the rising sheet 1. This will bring the largest mass of these coolers closely adjacent to the molten glass forming the sheet source so that sufficient heat can be quickly removed from the molten glass to reduce it to such a plastic condition that it may be drawn rapidly into sheet form. It will be noted that the coolers 6 cooperate with the tiles 5 to substantially enclose the entire surface of pool 2 with the exception of the narrow passage between the coolers through which glass sheet 1 is drawn upwardly. The upper inner portions 9 of the coolers slope away from the surfaces of the glass sheet so as to have a gradually diminishing cooling effect on the sheet as it is drawn upwardly therebetween. The coolers 6 are supported rigidly at their ends from castings 10 which rest on beams 11 at the sides of receptacle 3.

The adjacent ends of coolers 6 are connected near their lower edges by a U-shaped pipe member 12, the parallel side portions 13 of which provide a passage therebetween which is wider than the glass sheet 1 but considerably narrower than the distance between the coolers 6 at that elevation above the molten pool 2. In this way the U-shaped end cooler 12 will be positioned well down in the natural glass meniscus 8, as shown in Fig. 3, so as to restrict the upward passage of the glass adjacent the sheet edges, and force this glass to be drawn upwardly between the side members 13 and in direct contact therewith. A constant supply of cooling fluid such as water flows in through pipes 14 to the outer end of each U-shaped cooler 12 and thence into the ends of coolers 6. At the upper central portion of each cooler 6 is an outlet pipe 15 through which the heated fluid may flow out.

It will be noted that the end coolers 12 are of much smaller capacity than the central coolers 6 and have a very brief contact with the molten glass passing therethrough. However, since the cooling fluid passes directly into these members 12 while at its lowest temperature, and these coolers have direct contact with the molten glass, the edges of the sheet will be quickly chilled thereby to the proper working temperature, which should be somewhat cooler than that of the central portions of the sheet. These U-shaped end members 12 not only serve to properly chill the sheet edges, but provide the added drag or tension in the sheet edges which is desirable in drawing the sheet and maintaining it to width, and also serve to guide the sheet upwardly in the proper plane between the main coolers 6.

It will be noted that extensions 16 from cover-tiles 5 extend out beneath the U-shaped end coolers 12 so as to cover as completely as possible the surface of the molten pool 2.

In the modification shown in Fig. 5, the lower conformation of the main coolers 6 is so altered as to provide narrower curved lower portions 17 which contact directly with the sides of the lower portion of meniscus 8. The upper portion 18 of the meniscus is stretched upwardly between the vertical portions 19 of the cooler to form the sheet 1. With this construction the lower surfaces of the metallic coolers 6, which should be formed of some suitable heat-resisting alloy such as nicrome, are highly polished to avoid the formation of lines or other surface defects in the surface glass drawn in contact therewith. The end loops 12 operate in this case the same as in the modification first described.

Claims:

1. The method of forming continuous sheet glass, consisting in enclosing the upper surface of a pool of molten glass except for a narrow passage, drawing glass upwardly from the surface of the pool through this open passage in sheet form, chilling the glass as it leaves the pool and goes upwardly through the passage, and restricting the passage for the glass at the edges of the sheet.

2. The method of forming continuous sheet glass, consisting in enclosing the upper surface of a pool of molten glass except for a narrow passage, drawing glass upwardly from the surface of the pool through this open passage in sheet form, the confining walls of the passage for the sheet being chilled so as to absorb heat from the sheet at its source, the edge portions of the sheet being drawn in direct contact with the walls of the passage while the central body of the sheet is spaced therefrom.

3. In an apparatus for drawing sheet glass, an internally cooled metallic loop surrounding the sheet at its source, the end portions of the sides of the loop having a narrower passage therebetween than the central portions, and the molten glass forming the sheet edges being drawn through these narrow passages in contact therewith.

4. In an apparatus for drawing sheet glass, an internally cooled metallic loop surrounding the sheet at its source, the loop comprising small parallel end portions having a narrow passage therebetween, and larger parallel central portions with a wider passage therebetween, the sheet being drawn up through the passages from its molten source, with its edge portions in contact with the narrower passages.

5. In an apparatus for drawing sheet glass, an internally cooled metallic loop surrounding the sheet at its source, the end portions of the sides of the loop having a narrower passage therebetween than the central portions, and the molten glass forming the sheet edges being drawn through these narrow passages in contact therewith, means for feeding a cooling fluid to each end of the loop, and outlets for the fluid at the central portion of each side of the loop.

6. In an apparatus for drawing sheet glass, an internally cooled metallic loop surrounding the sheet at its source, the loop comprising small parallel end portions having a narrow passage therebetween, and larger parallel central portions with a wider passage therebetween, the sheet being drawn up through the passages from its molten source, with its edge portions in contact with the narrower passages, means for feeding a cooling fluid to each end of the loop, and outlets for the fluid at the central portion of each side of the loop.

7. In an apparatus for drawing sheet glass, in combination a substantially enclosed receptacle containing a pool of molten glass from the surface of which a sheet of glass is drawn upwardly, and an internally cooled metallic loop surrounding the sheet at its source, the loop being closely adjacent but above the surface of the pool.

8. In an apparatus for drawing sheet glass, in combination a substantially enclosed receptacle containing a pool of molten glass from the surface of which a sheet of glass is drawn upwardly, and an internally cooled metallic loop surrounding the sheet at its source, the loop being closely adjacent but above the surface of the pool, and the edges of the sheet being drawn in contact with the ends of the loop.

9. In an apparatus for drawing sheet glass, in combination a substantially enclosed receptacle containing a pool of molten glass from the surface of which a sheet of glass is drawn upwardly, and an internally cooled metallic loop surrounding the sheet at its source, the loop being closely adjacent but above the surface of the pool, the passage between the sides of the loop, being narrower adjacent the ends of the loop, and the sheet edges contacting therewith.

10. In sheet glass drawing apparatus, an internally cooled stationary edge forming member having a short narrow slot through which the sheet edge is drawn at its source, the sheet edge contacting with said edge forming member as it is drawn therethrough.

11. In sheet glass drawing apparatus, an internally cooled stationary edge forming member positioned immediately above the normal glass level, having a short narrow slot through which the sheet edge is drawn at its source, the sheet edge contacting with said edge forming member as it is drawn therethrough.

12. In sheet glass drawing apparatus, an internally cooled U-shaped member enclosing the sheet edge at its source, the glass being drawn between the parallel arms of the member and contacting therewith to form the sheet edge.

13. The method of forming continuous sheet glass, consisting in enclosing the upper surface of a pool of molten glass except for a narrow passage, drawing glass upwardly from the surface of the pool through this open passage in sheet form, and restricting the passage for the glass at the edges of the sheet, the edge portions of the sheet being drawn in direct contact with the walls of the passage while the central body of the sheet is spaced therefrom.

14. In an apparatus for drawing sheet glass, an internally cooled metallic loop surrounding the sheet at its source and through which the sheet is drawn, the edge portions of the sheet being drawn in direct contact with the loop while the central body of the sheet is spaced therefrom.

15. In an apparatus for drawing sheet glass, an internally cooled metallic loop surrounding the sheet at its source, said loop having substantially parallel arms defining a short narrow slot through which the sheet edge is drawn.

16. In sheet glass apparatus, means to draw a sheet of glass from a source of molten glass, said sheet including a sheet supplying meniscus, and heat absorbing means arranged on both sides of the sheet and having a portion adapted to fit substantially in the curvature of said sheet supplying meniscus.

17. In sheet glass apparatus, means for drawing a sheet of glass from a source of molten glass, said sheet including a sheet supplying meniscus, and a stationary cooling member having a portion adapted to fit substantially in the curvature of said sheet supplying meniscus, the cooler contacting with the edge portions of the sheet but being spaced from the central body portion thereof.

18. In sheet glass apparatus, means for drawing a sheet of glass from a source of molten glass, said sheet including a sheet supplying meniscus, and an internally cooled metallic loop surrounding the sheet at its base and having a portion adapted to fit substantially in the curvature of the sheet supplying meniscus, the end portions of the sides of the loop having a narrower passage therebetween than the central portions, the molten glass forming the sheet edges being drawn through these narrow passages.

Signed at Toledo, in the county of Lucas, and State of Ohio, this 22d day of March, 1924.

CLIFFORD A. ROWLEY.